United States Patent
Bergan et al.

(10) Patent No.: US 12,247,791 B2
(45) Date of Patent: Mar. 11, 2025

(54) ELEMENT FOR A THERMAL ENERGY STORAGE

(71) Applicant: EnergyNest AS, Billingstad (NO)

(72) Inventors: Pål Bergan, Nesøya (NO); Christopher Greiner, Vøyenenga (NO)

(73) Assignee: EnergyNest AS, Billingstad (NO)

( * ) Notice: Subject to any disclaimer, the term of this patent is extended or adjusted under 35 U.S.C. 154(b) by 72 days.

(21) Appl. No.: 17/972,115

(22) Filed: Oct. 24, 2022

(65) Prior Publication Data

US 2023/0059175 A1    Feb. 23, 2023

Related U.S. Application Data

(63) Continuation of application No. 15/105,145, filed as application No. PCT/NO2014/050250 on Dec. 19, 2014, now abandoned.

(30) Foreign Application Priority Data

Dec. 20, 2013 (NO) .................................. 20131725

(51) Int. Cl.
    *F28D 20/00*    (2006.01)
    *B23P 15/26*    (2006.01)
    (Continued)

(52) U.S. Cl.
    CPC ........... *F28D 20/0056* (2013.01); *B23P 15/26* (2013.01); *F28D 7/06* (2013.01); *F28D 7/12* (2013.01); *F28D 7/16* (2013.01); *F28D 2020/0013* (2013.01); *F28D 2020/0021* (2013.01); *F28D 2020/0078* (2013.01); *F28D 20/021* (2013.01); *Y02E 60/14* (2013.01)

(58) Field of Classification Search
CPC ...... F28D 20/0056; F28D 20/00; F28D 20/02; F28D 20/021; F28D 2020/0021; F28D 2020/0013; F28D 2020/0078; F28D 7/12; F28D 7/06; F28D 7/16; B23P 15/26; Y02E 70/30; Y02E 60/14
See application file for complete search history.

(56) References Cited

U.S. PATENT DOCUMENTS

| | | |
|---|---|---|
| 3,302,407 A | 2/1967 | Every |
| 3,381,113 A | 4/1968 | Jacques et al. |

(Continued)

FOREIGN PATENT DOCUMENTS

| | | | | |
|---|---|---|---|---|
| DE | 4328934 A1 | * | 3/1995 | ........... E04G 13/021 |
| DE | 10211598 A1 | | 9/2002 | |

(Continued)

OTHER PUBLICATIONS

U.S. Appl. No. 15/536,566, filed Jun. 15, 2017, Bergan et al.

(Continued)

*Primary Examiner* — Harry E Arant
(74) *Attorney, Agent, or Firm* — Bradley Arant Boult Cummings LLP

(57) ABSTRACT

An element for an easily scalable thermal energy storage, distinctive in that the element includes an outer shell being a combined casting form and reinforcement, a solid thermal storage medium in the form of hardened concrete, which concrete has been cast and hardened into said outer shell. A method for building and use of the element is also disclosed.

9 Claims, 7 Drawing Sheets

(51) Int. Cl.
F28D 7/06 (2006.01)
F28D 7/12 (2006.01)
F28D 7/16 (2006.01)
F28D 20/02 (2006.01)

(56) References Cited

U.S. PATENT DOCUMENTS

| | | | |
|---|---|---|---|
| 3,624,356 | A | 11/1971 | Havill |
| 4,010,731 | A | 3/1977 | Harrison |
| 4,085,333 | A | 4/1978 | Grise et al. |
| 4,194,496 | A | 3/1980 | Carlson |
| 4,203,489 | A | 5/1980 | Swiadek |
| 4,205,656 | A | 6/1980 | Scarlata |
| 4,219,074 | A | 8/1980 | Hansen |
| 4,323,113 | A | 4/1982 | Troyer |
| 4,395,620 | A | 7/1983 | Clyde et al. |
| 4,397,152 | A | 8/1983 | Smith |
| 4,405,010 | A | 9/1983 | Schwartz |
| 4,412,426 | A | 11/1983 | Yuan |
| 4,442,826 | A | 4/1984 | Pleasants |
| 4,452,229 | A | 6/1984 | Powers |
| 4,520,862 | A | 6/1985 | Helmbold |
| 4,524,756 | A | 6/1985 | Laverman |
| 4,993,483 | A | 2/1991 | Harris |
| 5,623,986 | A | 4/1997 | Wiggs |
| 5,694,515 | A | 12/1997 | Goswami et al. |
| 5,816,314 | A | 10/1998 | Wiggs et al. |
| 5,833,394 | A * | 11/1998 | McCavour ............. E01F 5/005 405/126 |
| 6,789,608 | B1 * | 9/2004 | Wiggs .................... F24T 10/15 165/45 |
| 2002/0053418 | A1 | 5/2002 | Hirano |
| 2004/0011395 | A1 | 1/2004 | Nicoletti et al. |
| 2008/0016866 | A1 | 1/2008 | Mohr |
| 2008/0219651 | A1 | 9/2008 | Nayef |
| 2008/0289795 | A1 * | 11/2008 | Hardin ................... F24T 10/15 165/45 |
| 2010/0199975 | A1 | 8/2010 | Bailey |
| 2011/0017196 | A1 | 1/2011 | Bell et al. |
| 2011/0100586 | A1 | 5/2011 | Yang |
| 2011/0100587 | A1 * | 5/2011 | Yang .................. F28D 20/0052 165/45 |
| 2011/0226440 | A1 | 9/2011 | Bissell et al. |
| 2011/0247354 | A1 | 10/2011 | Asai et al. |
| 2011/0272319 | A1 * | 11/2011 | Koivuluoma ......... F41H 5/0492 206/521 |
| 2011/0277470 | A1 | 11/2011 | Benyaminy et al. |
| 2011/0286724 | A1 | 11/2011 | Goodman |
| 2012/0055661 | A1 | 3/2012 | Feher |
| 2012/0285442 | A1 | 11/2012 | Hung |
| 2013/0111904 | A1 | 5/2013 | Stiesdal |
| 2013/0153169 | A1 | 6/2013 | Perryman |
| 2014/0110080 | A1 | 4/2014 | Bergan |
| 2014/0262162 | A1 * | 9/2014 | Zimmer ................. F28F 27/02 165/157 |
| 2014/0284021 | A1 | 9/2014 | Laurberg et al. |
| 2016/0320145 | A1 | 11/2016 | Bergan et al. |
| 2017/0363368 | A1 | 12/2017 | Bergan et al. |
| 2018/0003445 | A1 | 1/2018 | Bergan et al. |

FOREIGN PATENT DOCUMENTS

| | | |
|---|---|---|
| DE | 10350879 A1 | 1/2005 |
| DE | 102009036550 A1 | 5/2010 |
| DE | 102011085722 A1 | 5/2013 |
| EP | 0941759 A1 | 9/1999 |
| EP | 2525051 A1 | 11/2012 |
| GB | 2049921 A | 12/1980 |
| GB | 2489011 A | 9/2012 |
| JP | S58-156151 A | 9/1983 |
| JP | 2000-161882 A | 6/2000 |
| JP | 2004-309124 A | 11/2004 |
| JP | 2008-281320 A | 11/2008 |
| JP | 2009270280 A * | 11/2009 |
| JP | 2014-520243 A | 8/2014 |
| NO | 20141540 A1 | 6/2016 |
| WO | WO-9747825 A1 | 12/1997 |
| WO | WO-2006046874 A1 | 5/2006 |
| WO | WO-2008106700 A1 | 9/2008 |
| WO | WO-2010060524 A1 | 6/2010 |
| WO | WO-2012169900 A1 | 12/2012 |
| WO | WO-2014003577 A1 | 1/2014 |
| WO | WO-2014044254 A2 | 3/2014 |
| WO | WO-2015093980 A1 | 6/2015 |
| WO | WO-2016099289 A1 | 6/2016 |
| WO | WO-2016099290 A1 | 6/2016 |

OTHER PUBLICATIONS

U.S. Appl. No. 15/536,585, filed Jun. 15, 2017, Greiner et al.
Hodneland, John Andre Wilhelmsen, "International Search Report," prepared for PCT/NO2014/050250, as mailed Mar. 13, 2015, five pages.
Bozis, D. et al., "On the Evaluation of Design Parameters Effects on the Heat Transfer Efficiency of Energy Piles," Energy and Buildings 43, Dec. 28, 2010, pp. 1020-1029.
Laing, D. et al., "Thermal Energy Storage for Direct Steam Generation," Solar Energy 85, Oct. 20, 2010, pp. 627-633.
CETCO Drilling Products, Grouts & Sealants Technical Data, "Geothermal Grout / Enhanced Thermally Conductive Grout", Rev. 1/09.
Markovic, Nebojsa, "International Search Report," prepared for PCT/NO2015/050252, as mailed Mar. 10, 2016, three pages.
Bråten, Knut, "International Search Report," prepared for PCT/NO2015/050253, as mailed Mar. 14, 2016, three pages.

* cited by examiner

Example of multiple row arrangement

ELEMENT FOR A THERMAL ENERGY STORAGE

CROSS-REFERENCE TO RELATED APPLICATIONS

This application is a continuation of U.S. application Ser. No. 15/105,145, filed on Jun. 16, 2016. U.S. application Ser. No. 15/105,145 is a U.S. National Stage of Application No. PCT/NO2014/050250, which claims priority from Application No. 20131725 filed on Dec. 20, 2013 in Norway. The contents of these applications are incorporated herein by reference in their entirety.

FIELD OF THE INVENTION

The present invention relates to storage of energy. More specifically, the invention relates to an element for a solid-state thermal energy storage (TES), making fabrication, scaling up or down, operation and maintenance of a thermal energy storage simpler, more efficient and durable, thereby reducing cost for storage and subsequent delivery of energy.

BACKGROUND OF THE INVENTION AND PRIOR ART

Energy in the form of electricity and heat is vital for the modern society. The majority of all energy today comes from fossil primary energy sources such as coal, oil and gas. Emissions from fossil energy ultimately lead to global warming and other negative environmental effects. The world has now slowly started the transition towards renewable energy sources such as solar and wind energy. The inherent nature of these energy sources are that they are dependent on sun, weather and climatic conditions, which ultimately leads to intermittent and low reliability of energy supply. Most countries now have the ambition of increasing the share of renewable energy in their total energy mix, phasing out polluting fossil power plants. Unfortunately, it has proven to be very difficult to shut down such plants simply because most renewable energy source are unreliable and cannot guarantee delivery of power when it is needed; thus, conventional power production capacity has to be maintained rather than being phased out. For this reason, efficient, large-scale energy storage has been identified as the key enabler to facilitate transition to reliance on renewable energy and making energy from renewables predictable and reliable.

Thermal energy storage (TES) will have a key role in this future, especially in concentrating solar power (CSP) plants where heat from the solar field can be stored during the day and released for use during the late evening and night. TES can also be used to store surplus energy from wind or photovoltaic plants by converting surplus electricity to heat, which may be reconverted to electricity later. TES may also find applications in conventional fossil based or nuclear power plants, enabling increased operational flexibility, which is becoming more and more urgent in areas with high penetration of intermittent renewable energy sources.

Energy storage is in effect a question of time shifting energy from when it is produced to when it is needed. Some factors are of particular interest for energy storages, such as: energy loss, storage capacity, rate of energy transfer during input-output, and clearly also cost. The challenge is to develop energy storage technology that can deliver on all these factors. Storage of energy allows delivery at times when variable sources cannot deliver, allowing a larger proportional part of the energy sources to be renewable and friendly to the environment. In addition, the maximum delivery can be increased, since both the sources and the storages can deliver energy at the same time, and the networks for transfer of electrical energy or heat energy can be smaller since storages can be located where the demand is found.

Despite provisions with support from governments, overall cost performance is and will be the main driver for the shift towards renewable and sustainable energy on a large scale. In the end, the crucial challenge is to come up with sustainable energy technology and, in particular, new energy storage technology that can facilitate the much-wanted shift towards environmentally friendly power delivery.

In patent publication WO 2012/169900 A1, a TES is described, having beneficial properties over prior art storages. More specifically, a practical and cost effective solution is provided for a thermal storage using solid state material as the main storage medium, allowing storage of energy as high temperature heat, which means thermal energy at temperature sufficiently high to convert the heat effectively into electric power in a turbine-generator set or equivalent means. According to claim 1 of WO 2012/169900 A1, obligatory features include a heat transfer container containing a heat transfer fluid, all heat transferring convection and conduction by the heat transfer fluid takes place within the heat transfer container. The means for energy input are high pressure pipes, for receiving heat from solar power plants, coal power plants, nuclear sources, biomass sources and other sources able to deliver energy as hot fluid, and optionally electrical heaters, for receiving energy from sources able to deliver electrical energy, such as wind turbines or photovoltaic based solar plants. The means for energy output are separate high-pressure pipes or the same high pressure pipes used for heat input. The thermal energy storage of WO 2012/169900 A1 is called a NEST thermal energy storage.

In international patent application WO 2014/003577 A1, it is described how the thermal energy storage of WO 2012/169900 A1 is beneficial in order to simplify and increase efficiency of energy plants of various types, such as concentrated solar power plants. Essential features provide efficiency and simplicity of transferring energy from the heat source and delivering the stored heat to a turbine or other user.

Even though the teaching of WO 2012/169900 A1 and WO 2014/003577 A1 provide significant steps toward increased use of environmentally friendly energy sources on behalf of fossil sources and nuclear sources, improvements are still required. In practice, cost is and will be the main incentive in this respect, even though governments make provisions for increasing the shift toward solutions more friendly to the environment. Cost is not only related to material cost and building cost, but is also related to operational cost, durability, maintenance and overall energy efficiency. Finding an improved technology and design for a solid state TES can have a significant economic impact, thereby helping to shift the energy market in a more sustainable direction.

Therefore, a demand exists for technology that can reduce cost and enhance the performance of TES.

SUMMARY OF THE INVENTION

The present invention meets the demand by providing a surprisingly simple and versatile element for a thermal energy storage.

More specifically, the invention provides an element for an easily scalable thermal energy storage, distinctive in that the element comprises:
- an outer shell being a combined casting form and reinforcement,
- a solid thermal storage medium in the form of hardened concrete, which concrete has been cast and hardened into said outer shell.

Preferably, the outer shell is a metal shell. Alternatively, the outer shell is a woven fibre shell, for example a carbon fibre—, glass fibre—or boron fibre shell, or a composite material shell or a carbon material shell, or other material meeting the functional requirements for the specific embodiment and use thereof. More specifically, reinforcement strength, thermal conductivity, properties at elevated temperatures and resulting cost are the most relevant parameters for meeting functional requirements. An outer steel shell, such as a carbon steel shell or a stainless steel shell will be most preferable for most embodiments.

The outer shell is preferably a metal shell, having a cross section shape that is circular, hexagonal, quadratic, rectangular, rectangular with rounded corners or half-circle short sides, or polygonal or other shape. Preferably, for applications with very high temperature or large dynamic temperature range, the element has circular cross section shape for best withstanding of thermal stress.

Preferably, the outer shell is open in one end, into which open end the fresh, unhardened concrete has been poured and cast. Optionally, the open end has been closed with a metal shell lid after casting, which is preferable for embodiments where the elements are to be fully contained within a housing of a thermal energy storage. Alternatively, the outer shell can be open in both ends, but having a preliminary lid during casting in one end, with or without openings for heat exchangers or other equipment to be cast in and hence embedded. The method of casting the solid thermal storage concrete is preferably a one step method, however, the casting method can include several steps, for example leaving bores for heat exchangers after the first step, inserting the heat exchangers and subsequently casting in and hence embedding the heat exchangers, using the same quality of concrete or a higher quality grouting for the subsequent casting.

The outer metal shell is corrugated, with regular corrugations or with bucked surface of the Spiro-pipe type, or the outer metal shell is smooth and even.

The element of the invention preferably comprises one or both of a heat exchanger and an electric heating element, as means for heat input and output, said means have been cast into the concrete and thus imbedded into the element. Most preferably, the heat exchanger is dimensioned to provide turbulent flow of the heat transfer fluid at normal operating conditions. For a small diameter pipe heat exchanger, this means that Re>4000, more preferably Re>5000, where Re is the Reynold's number. To this end, the pipes must have relatively small internal diameter compared to the flow rate, hence the term small diameter pipe. As known for people skilled in the art, Re=QD/vA, where Q is volumetric flow rate ($m^3/s$), D is inner pipe diameter (m), v is kinematic viscosity ($m^2/s$) and A is pipe cross sectional area ($m^2$). The small diameter pipes also facilitates flow of high pressure fluid for heat input and output, in a relative thin walled pipe compared to larger diameter pipes. For other cross section shapes, the Re at normal operating conditions should accordingly also be in the range for turbulent flow, since turbulent flow in the heat exchanger improves the heat exchange. Optionally, the heat exchanger has external fins, protrusions, plates or other structural augmentations increasing the surface area for heat exchange with the solid state storage medium, however, caution with respect to avoid cracking of the concrete must be taken into account for the detailed design. As an alternative or an addition to embedded electric heaters, electric source heat input can take place by heating the heat transfer fluid before said fluid reaches the elements.

In an embodiment for high temperature applications, due to thermal stress resistance, the element comprises a small diameter pipe heat exchanger, in the form of an open-end smaller diameter pipe section arranged inside a larger diameter closed end pipe section.

Preferably, the element comprises one or more embedded small diameter tubular pipe heat exchangers, as one, two, three, four or more U-shaped pipe sections, preferably two U-shaped pipe sections arranged in parallel in the solid thermal storage material but connected to a common inlet and a common outlet, or one or more helix shaped imbedded small diameter pipe heat exchangers. These embodiments are preferable for a wide range of operating temperatures and dynamic temperature ranges. As mentioned, the term small diameter pipe refers to small diameter compared to the flow rate, resulting in a turbulent flow at normal flow rate. Embodiments with multiple U-shaped small diameter pipes, or multiple heat exchanger elements of U-shape or other shape, can be in one continuous pipe system or be several pipe systems, coupled in series or in parallel. Continuous pipe systems saves connections and reduces possible leakage points, but can be difficult to make.

The element preferably comprises imbedded means for heat input and output, arranged with connections or ends from one side of the element. The outer shell preferably is a steel shell made of thin sheet metal having wall thickness 0.1-1 mm, preferably about 0.5 mm wall thickness, and it has been wound and formed into a circular cross section shape from steel bands, likewise a ventilation duct, and optionally shaped further, for example to a hexagonal cross section shape, and it has a bottom lid or cap. The solid thermal storage medium preferably is an easily castable grouting or concrete mixture having enhanced thermal storage capacity, enhanced thermal conductivity and enhanced resistance against thermally induced cracking, compared to normal construction concrete, which is standard concrete for construction purposes. The term concrete in this context includes refractory materials that can be hardened into the outer shell, useful for the highest operating temperatures. An outer metal shell is alternatively made by longitudinal folding of a flat metal strip and joining the strip sides by welding or folding.

The invention also provides a method of building an element according to the invention. The method is distinctive by the steps:
- to arrange the outer shell in a vertical position, with an open upper end,
- to fill grouting or concrete mixture into the outer shell, up to a prescribed level, using the outer metal shell as a combined casting form and reinforcement.

Preferably, the method comprises the further steps:
- to arrange the means for heat input and output into the outer shell, using spacers and external fixtures as required, before casting,
- to fill grouting or concrete mixture up to a prescribed level at which the ends or connections of said means extend up over the top of the element as standing vertical.

Preferably, the method comprises to vibrate the element during casting, to enhance the compaction of the concrete and remove air bubbles.

The invention also provides use of the elements of the invention, for building, scaling up or down, or undertaking maintenance, of a thermal energy storage.

The feature of having an outer shell such as a metal shell, being a combined casting form and reinforcement facilitates cost-efficient, simple, mass production of easily transportable elements. The element preferably contains no further armouring or reinforcement, except of possible fibres or special aggregates in the castable grouting or concrete, and the possible reinforcing effect of imbedded heat exchangers or heaters, which simplifies production and reduces cost. The armouring or reinforcement accordingly consists of the outer shell. The element and hence the outer shell, preferably has a round or in substance round shape, as seen in cross section, since this provides an extreme resistance against thermally induced cracking, allowing very high temperatures and very high dynamic temperature ranges in operation without damaging the element. The ring shaped outer shell has an ideal shape for taking up the ring tensions as experienced by varying the temperature during operation of a thermal storage containing elements of the invention. Preferably, the outer shell is like a section of a ventilation duct, often called a "Spiro"-type pipe. This is a wound pipe where metal bands of steel or aluminium have been folded and/or fused together when the pipe was formed by winding. A bottom lid or cap or similar, is provided in the lower end. The strength of the shell, and hence the thickness thereof, must be sufficient to withstand the hydrostatic pressure when casting of the grout or concrete takes place. Alternatively, any pipe section being sufficiently strong at casting and operation can be used or the metal bands can be welded or joined in other ways. Electro welding the bands by arranging the bands with overlap between two compressing rotating electrodes is one example of an alternative feasible joining method. However, machines for winding Spiro type pipes or ventilation ducts are commercially available on the market from several vendors, such machines are useful for producing the outer shell of the elements of the invention.

The invention also provides a thermal energy storage, distinctive in that it comprises elements of the invention, a thermally insulated housing, into which housing the elements have been arranged, and means for thermal energy input and output. The number of elements of the invention in a storage of the invention can vary broadly, and one distinctive feature is how easy the storage is to scale up or down, by adding or taking out elements of the invention, being of a size and weight easy to handle with a building site crane. The number of elements in a storage can be 2, 5, 10, 40, 100, 200 or 500 and above, and any integer in between. Accordingly, said number can range from less than 10 to several 10's of thousands or more, depending on the size of each element and its respective energy storage capacity, and the desired energy storage capacity of the whole storage system. As an example, an element with 12 meters length and 250 mm diameter may be able to store 25-50 kWh of thermal energy or more, and so a TES with 50 MWh capacity would require 1000-2000 of such elements. Likewise, installation, maintenance, repair and replacement is easy, by installing, taking out or setting in elements of the invention with a crane. The elements can be arranged vertically standing, side-by-side, as one or more groups of elements in a thermal storage, or horizontally laying and stacked as one or more groups of stacks of elements in a thermal storage. The elements can be arranged in a fixture or template or with intermediate elements for stacking, or the elements can be arranged closely stacked or packed, dependent on the requested performance and integration in existing power plants or systems and available sources for energy. Different embodiments have different advantages. However, there are two main groups of embodiments, namely with or without an active heat transfer and storage fluid in the volume inside the storage, between the elements and inside the housing. Said active heat transfer and storage fluid is either stagnant or dynamic. Said stagnant fluids are liquids, such as a thermal oil, molten salt or molten metal, or a liquid-solid phase change material (PCM). Said dynamic fluids are gases or liquids. A close packing or near close packing of elements of the invention can be feasible for storages of the invention containing stagnant heat transfer or storage liquid or PCM. Feasible for element packing allowing flow around the elements, is a dynamic active heat transfer and storage fluid in the volume inside the storage housing, between the elements. This means a fluid flowing through the thermal storage, outside and around the elements but inside the housing, the storage housing having an inlet and an outlet for such fluid. Such active fluid can be hot gases, such as exhaust gas, combusted gas, flue gas or other hot gas, up to temperature withstandable for the outer shell and optional imbedded heat exchangers or heaters, such as up to about 1000-1200° C. Oils can be used active and melted salts or metals can be used active. The flow of the dynamic active fluid around the elements in the housing is achieved by gravity or forced flow, or both. Forced flow, or forced convection, is achievable by separate pumping or compressing or by inherent pressure in the fluid as delivered from the source. One or both of increased heat storage capacity and increased heat transfer rate of the storage is provided with said heat transfer and storage fluid inside the housing, between the elements and the housing. Furthermore, for heat storage embodiments with an imbedded heat exchanger in some or all of the elements, heating and evaporation of circulated water or other feasible fluid through the heat exchanger is facilitated, which is beneficial for connecting the heat exchanger directly to a turbine, such as a steam turbine. For direct evaporation of for example water to steam in the elements, when taking out energy from the storage, the flow of water through the heat exchangers and storage is preferably arranged to be gradually or stepwise upwards, by arranging the elements horizontal and arranging the water flow gradually or stepwise upwards, from element to element. Thereby both the flow in the imbedded heat exchangers and separation effect due to gravity act in the desired direction upwards and toward the outlet, which outlet from the heat exchangers preferably is at a high point of the storage while the inlet to the heat exchangers preferably is at a low point of the storage.

The element of the invention may comprise any feature described or illustrated in this document, in any operative combination, each such combination is an embodiment of the invention. The storage of the invention may comprise any feature described or illustrated in this document, in any operative combination, each such combination is an embodiment of the invention. The method of the invention may comprise any step or feature described or illustrated in this document, in any operative combination, each such combination is an embodiment of the invention.

FIGURES

The invention is illustrated by eight Figures, of which:

DETAILED DESCRIPTION

Figure 1:
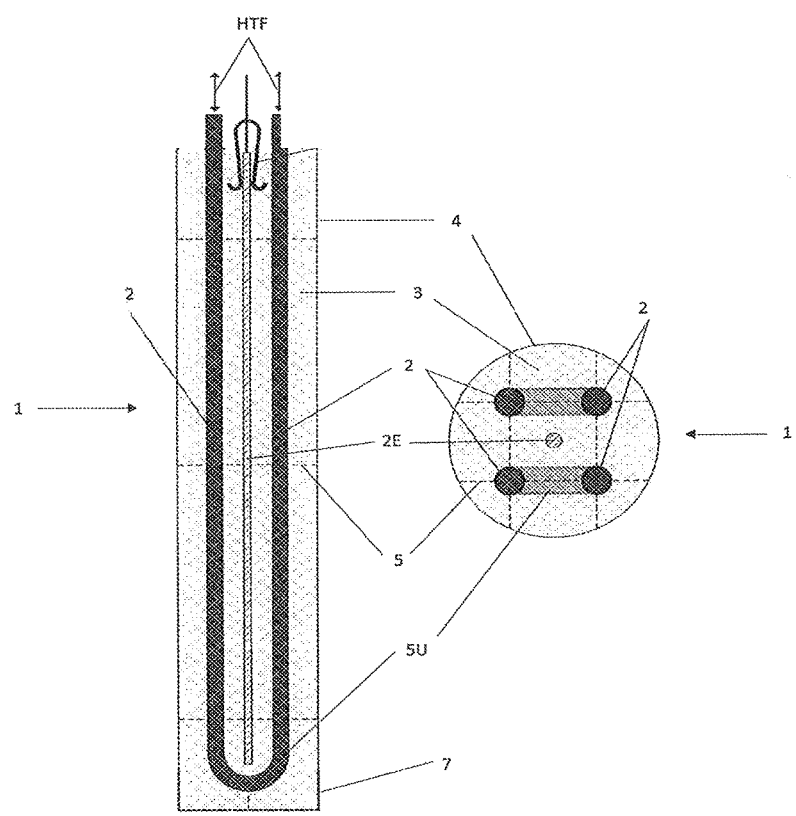
FIG. 1 illustrates an element of the invention.

Reference is made to FIG. 1, illustrating a double U-bend element 1 of the invention, in longitudinal section and cross section. The element 1 for a thermal storage comprises means for heat input and output 2, a solid thermal storage medium 3 inside an outer metal shell 4 being a combined casting form and ring reinforcement. The means for heat input is one or both of small diameter pipe heat exchangers 2 and an electric heating element 2E, and the means for heat output is said small diameter pipe heat exchangers 2. Arrows for heat transfer fluid (HTF) flow in or out are indicated, and the figure illustrates spacers 5, a (optional) steel hook 6 useful as a lifting lug, and a steel end cap 7. The double U-bend element is named so because two U-bends 5U are arranged in parallel but a distance apart in the concrete or grouting. Each small diameter pipe heat exchanger extends from over the concrete of the element, with upper ends extending over the concrete, to or close to the lower end of the element, where the U-bend connects two parallel straight sections. The bends 5U have been joined by welding or by other method to the straight thin pipe sections. Alternatively, a continuous thin pipe could have been bent into correct shape in a bending machine, such as an induction-bending machine, with several bends and several straight sections, with only the terminal ends extending up above the concrete. Optionally, one or more of the upper bends can extend above the concrete, to function as lifting lugs. Alternatively, two or more embedded U-bends in an element can be connected in series. The pipe diameter is sufficiently small to ensure turbulent flow, and the arrangement provide small heat conduction distance and large surface area, whilst still providing a relatively small, light element possible to lift and handle with simple cranes, which is considered a preferable embodiment.

Figure 2:
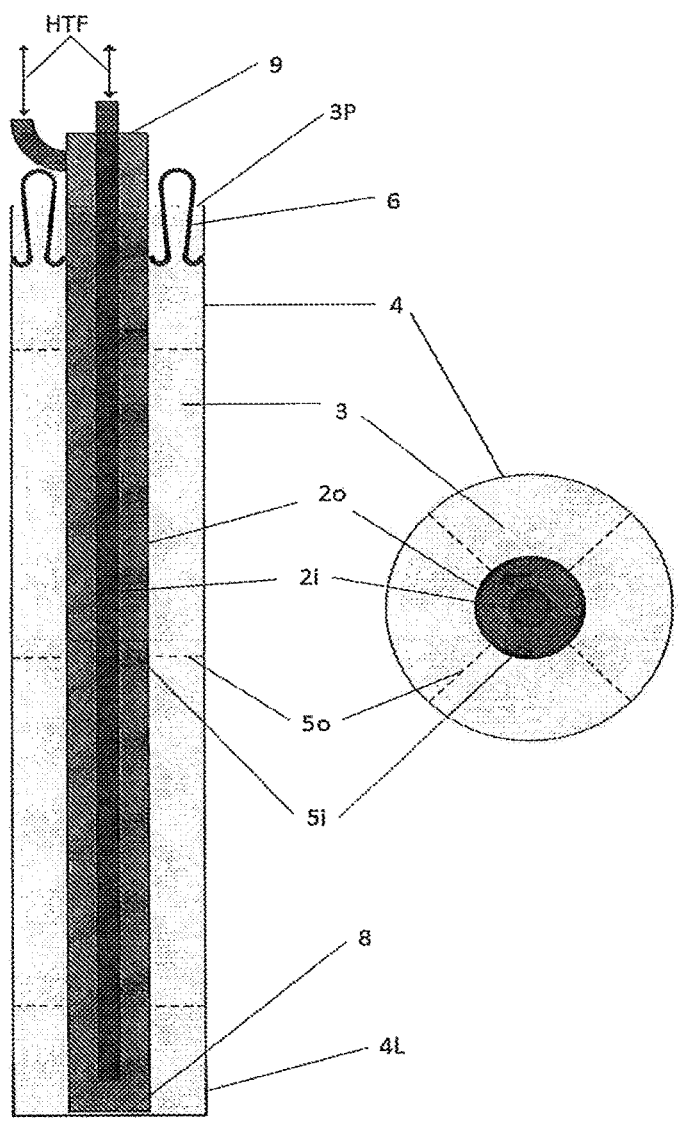
FIG. 2 illustrates another embodiment of an element of the invention.

Reference is made to FIG. 2, where a pipe-in-pipe element of the invention is illustrated in longitudinal section and cross section. Similar or identical elements have the same reference numerical as in FIG. 1. The means for heat input and output is in this embodiment an inner pipe 2i arranged into an outer pipe 2o, which can be seen clearly in the Figure. The inner pipe 2i has an open lower end, when the element is standing vertical, such as during casting, and the inner pipe lower end has not been brought all the way down to the lower end of the outer pipe 2o. The lower end of the outer pipe is closed, either against the steel cap 4L in the lower end of the element or by a separate cap or lid 8. Similarly, the outer pipe is closed towards the inner pipe at the top 9. For this embodiment, inner spacers 5i and outer spacers 5o are provided, for holding the inner and outer pipe section during casting, respectively. The pipe-in-pipe embodiment is feasible where the thermally induced stress is extreme, such as at the terminal ends of stacks of elements in a large thermal storage comprising many elements connected in series. The flow cross sectional area of the inner pipe and the outer pipe with the inner pipe inserted, are similar or identical, or the Reynold's number of the inner pipe and outer pipe with the inner pipe inserted are similar or identical, providing turbulent flow, contrary to prior art solutions.

Figure 3:
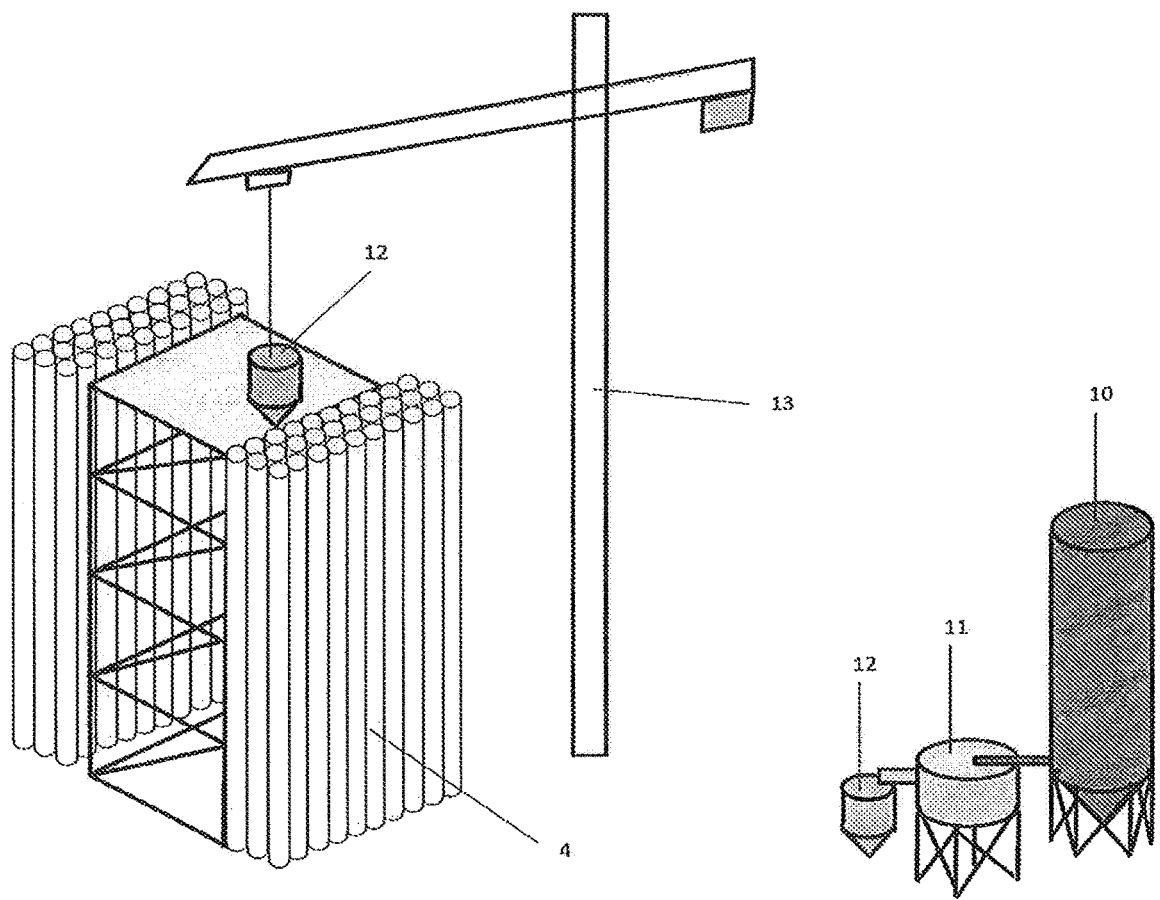
FIG. 3 illustrates one possible way of performing the casting process of the invention.

FIG. 3 illustrates a method of the invention for building an element of the invention. More specifically, the casting step is illustrated, whereby the outer metal shell, into which the means for heat input and output have been arranged correctly (not illustrated specifically), is filled with grouting or concrete up to a prescribed level 3P (visible in Fig. Nos. 1 and 2) at which the ends or connections of said means extend up over the top of the element as standing vertical. Essential in this respect is using the outer shell as a combined casting form and ring reinforcement, so that no separate form is required and no additional reinforcement or armouring is required. Accordingly, the cost and work with separate casting forms and separate reinforcement are avoided, helping to simplify the method and reducing cost. Typical equipment for concrete mixing and delivery can be used, such as a dry mix silo 10, a compulsory concrete mixer 11 and concrete buckets 12 to be handled by a crane 13 for the casting operation. Alternative building site arrangements can be used, such as pumping the concrete mixture into the outer shells, or using a combined feeding and mixing device, such as a feeding and mixing screw or conveyor, or a conveyor belt. A typical element height, as standing vertical, is 4-12 m, a typical diameter is 0.20-0.35 m. A typical element weight is 0.4-2 metric tons. Scaling the storage up or down is simple, by adding or removing elements. Replacing damaged elements is simple by using a crane, facilitating maintenance. The elements can be cast directly as positioned in a storage of the invention.

Figure 4:
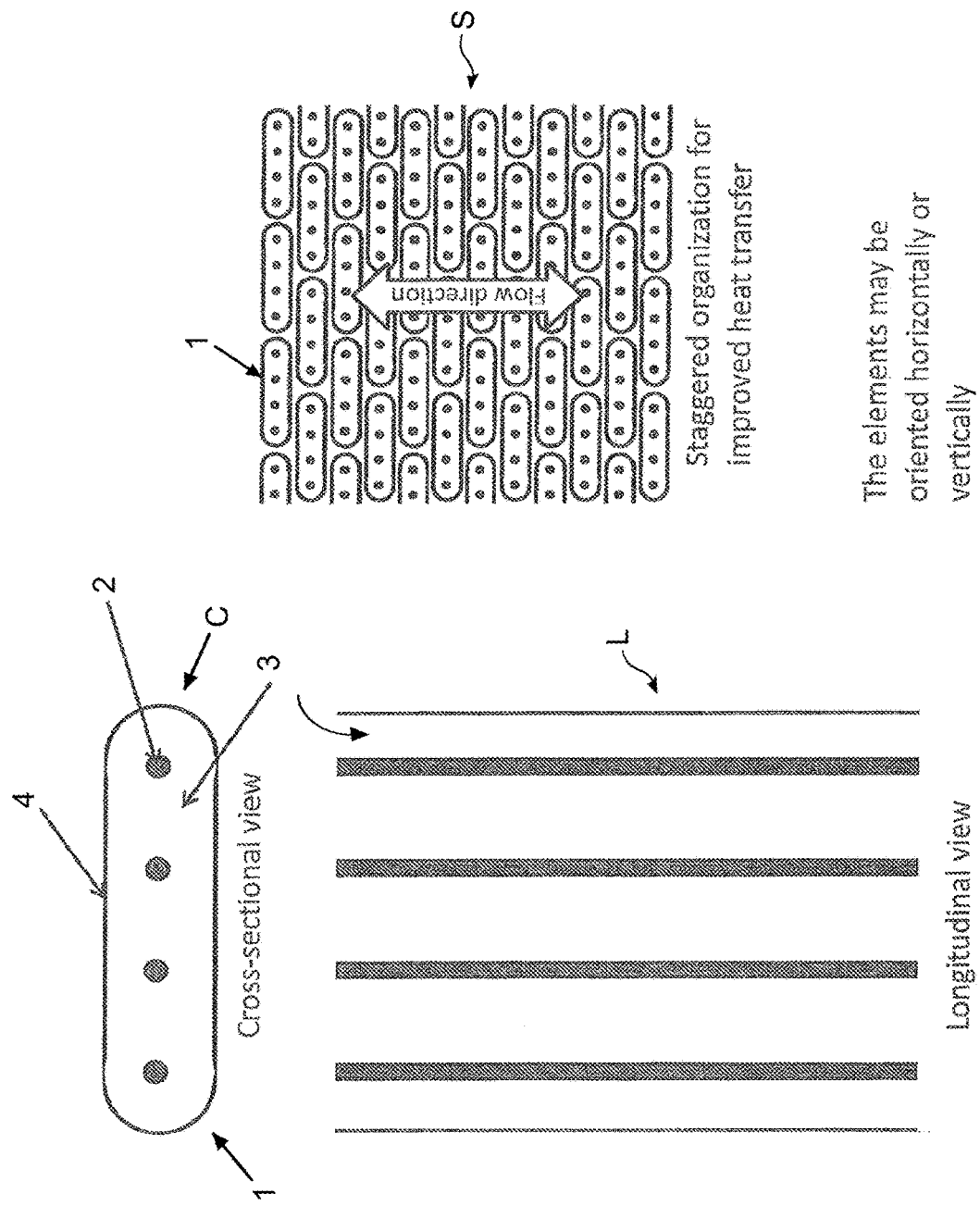
FIG. 4 illustrates a further embodiment of an element of the invention, and also a detail of a thermal storage of the invention comprising elements of the invention.

FIG. 4 illustrates a further embodiment of an element 1 of the invention, and a detail of a thermal storage of the invention comprising elements of the invention. More specifically, the element, illustrated in cross section C and longitudinal section L, has a flat rectangular like cross section shape, with half circle shaped short sides, as seen on the cross sectional view. Heat exchangers 2 have been cast in concrete 3 in the outer shell or lining 4 and thus imbedded. In a thermal storage of the invention, the elements can be arranged with vertical or horizontal orientation, or inclined orientation. A detail of a storage S of the invention, with staggered organisation of elements for improved heat transfer of a dynamic active heat transfer and storage fluid, is also illustrated.

Figure 5:
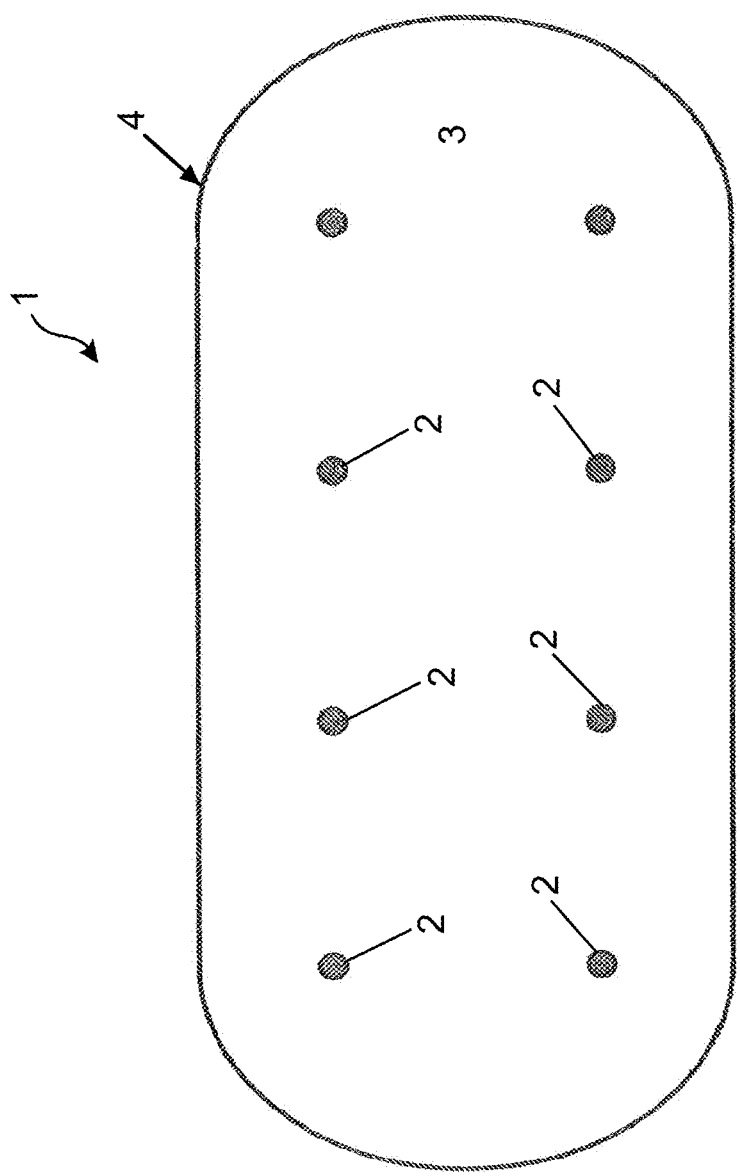
FIG. 5 illustrates an element of the invention with multiple rows of imbedded heat exchangers.

FIG. 5 illustrates an element 1 of the invention with multiple rows of imbedded head exchangers 2 into a rectangular like outer shell 4.

Figure 6:
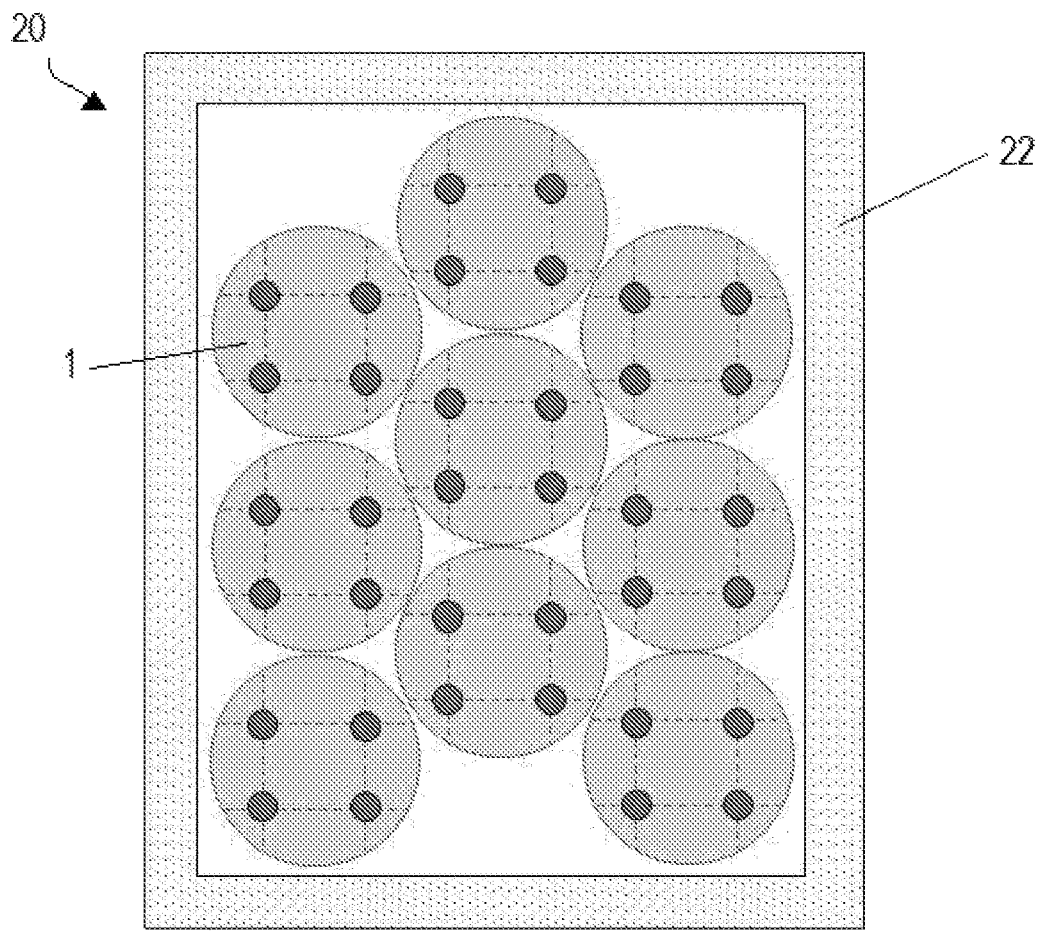
FIG. 6 illustrates an embodiment of a thermally insulated housing.

FIG. 6 illustrates an example of a thermally insulated housing 20 that includes a layer of insulation 22. An arrangement of elements 1 is shown arranged within the thermally insulated housing 20.

Figure 7:
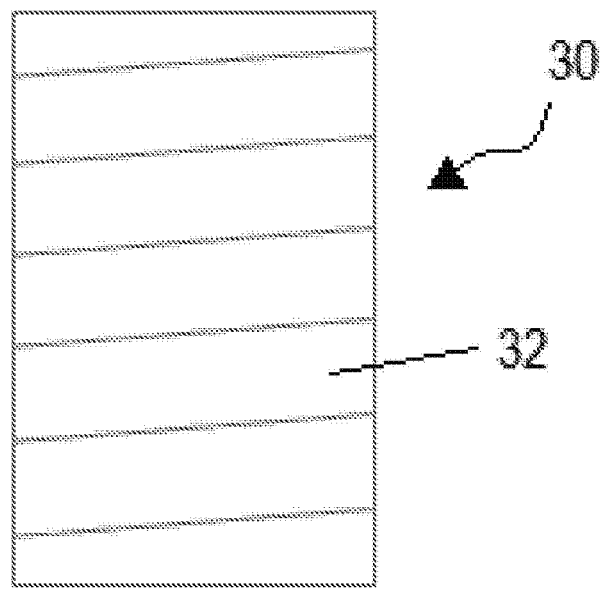
FIG. 7 illustrates an embodiment of a spiro pipe.

FIG. 7 illustrates a spiro pipe 30. In some embodiments, the element 1 discussed above may comprise the spiro pipe 30. The spiro pipe 30 is a wound pipe where metal bands 32 of steel or aluminium have been folded and/or fused together when the pipe was formed by winding. A bottom lid or cap or similar, is provided in the lower end. The strength of the shell, and hence the thickness thereof, must be sufficient to withstand the hydrostatic pressure when casting of the grout or concrete takes place. Alternatively, any pipe section being sufficiently strong at casting and operation can be used or the metal bands can be welded or joined in other ways. Electro welding the bands by arranging the bands with overlap between two compressing rotating electrodes is one example of an alternative feasible joining method. However, machines for winding Spiro type pipes or ventilation ducts are commercially available on the market from several vendors, such machines are useful for producing the outer shell of the elements of the invention.

Figure 8:
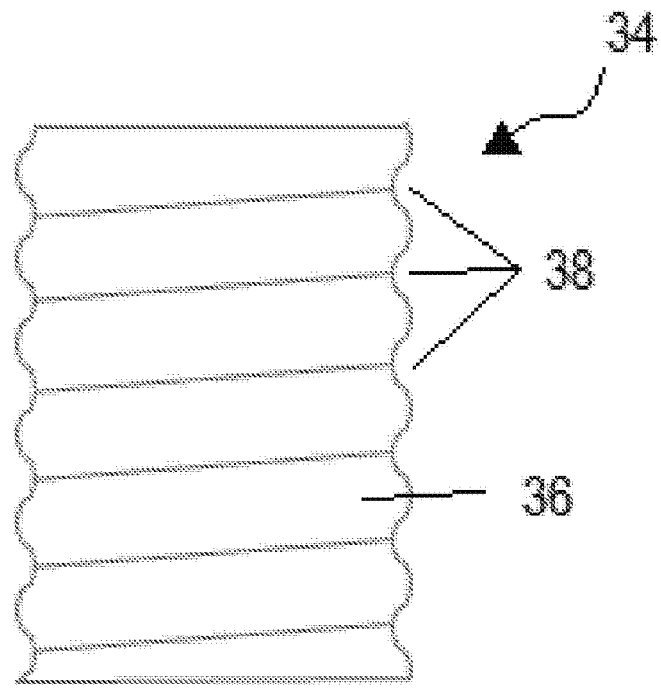
FIG. 8 illustrates an embodiment of a corrugated spiro pipe.

FIG. 8 illustrates a corrugated spiro pipe 34. In some embodiments, the element 1 discussed above may comprise the spiro pipe 34. The corrugated spiro pipe 34, similar to the spiro pipe 30, is a wound pipe where metal bands 36 of steel or aluminium have been folded and/or fused together when the pipe was formed by winding. The corrugated spiro pipe 34 is corrugated with regular corrugations 36 along a length of the corrugated spiro pipe 34.

The element of the invention is designed for any operating temperature ranging from subzero to 1000° C. or more. Operating temperature is limited by material and fluid properties and adapted to the specific application of the TES; typically 200-550° C. for thermal storages connected to steam turbines or organic rankine cycles. However, if used for district heating, freezing storage or air conditioning purposes, the element temperature can be below freezing, e.g. −40° C., or below 100° C. Very low temperatures may require special fluid for circulation in the pipes for heat input and output. It is to be noted that the fluid inside the heat exchanger is not in direct contact with the concrete; this means that there will be no problem with using fluids under pressure or fluids with chemical composition that can be damaging for the concrete for heat transfer means.

The invention claimed is:

1. A method of building an element for a thermal energy storage, the method comprising:
   building an outer shell, with one open end and a closed opposite end, the outer shell comprising a steel wall and a closed steel shell bottom, both having a thickness of 0.1-1.0 mm, the outer shell being a combined casting form and ring reinforcement;
   arranging the outer shell in a vertical position, with the open end upwards and the closed end downwards;
   arranging a pipe heat exchanger in the form of an open end smaller diameter pipe section arranged inside a larger diameter closed end pipe section, coaxially inside the outer shell for heat input and output, with cross sectional area or a Reynold's number for flow in the inner pipe and between the inner and outer pipes being identical;
   filling thermal energy storage material in the form of grouting or concrete mixture up to a prescribed level at which the ends or connections of said heat exchanger extend up over the concrete or grouting of the element as standing vertical, wherein the outer shell functions as a combined casting form and reinforcement; and
   wherein the resulting hardened concrete solid continuous thermal storage medium completely fills a volume between the outer shell and the pipe heat exchanger and any spacers extending between and connecting the outer shell and the pipe heat exchanger, the volume extending from the closed outer shell bottom up to a prescribed level from where the pipe heat exchanger ends or connections extend up above the hardened concrete solid continuous thermal storage medium if seen with the element standing vertical, wherein said volume inside the outer shell consists of hardened concrete solid continuous thermal storage medium.

2. The method according to claim 1, wherein the outer shell is wound and formed into a circular cross-section shape from steel bands.

3. The thermal energy storage element, built according to the method of claim 1.

4. A method of building an element for a thermal energy storage, the method comprising:
   building an outer shell, with one open end and a closed opposite end, the outer shell comprising a steel wall and a closed steel bottom, both having a thickness of 0.1-1.0 mm, the outer shell being a combined casting form and ring reinforcement;
   arranging the outer shell in a vertical position, with the open end upwards and the closed end downwards;
   building and arranging two U-shaped pipe heat exchangers inside the outer shell, wherein each pipe heat exchanger is shaped as a U-shaped pipe section comprising a U-bend with two straight pipe leg sections, wherein each U-shaped pipe section is arranged as positioned in one plane with the U-bend in the plane, wherein the two U-shaped pipe sections are arranged in different, parallel planes, with the U-bends perpendicular to each other and with each straight part of the two U-shaped pipe sections into one quadrant different from the other straight parts with concrete or grouting between the straight parts, as seen in cross section of the elements, wherein each U-shaped pipe heat exchanger has an identical flow cross-sectional area along the full embedded length;
   filling thermal energy storage material in the form of grouting or concrete mixture up to a prescribed level at which the ends or connections of said U-shaped pipe heat exchangers extend up over the concrete or grouting of the element as standing vertical, wherein the outer shell functions as a combined casting form and reinforcement; and
   wherein the resulting hardened concrete solid continuous thermal storage medium completely fills a volume between the outer shell and the pipe heat exchangers and any spacers extending between and connecting the outer shell wall and the pipe heat exchangers, the volume extending from the closed outer shell bottom up to a prescribed level from where the pipe heat exchanger ends or connections extend up above the hardened concrete solid continuous thermal storage medium if seen with the element standing vertical, wherein said volume inside the outer shell consists of hardened concrete solid continuous thermal storage medium.

5. The method according to claim 4, wherein the outer shell is wound and formed into a circular cross-section shape from steel bands.

6. The method according to claim 4, wherein the U-shaped pipe heat exchangers are formed by bending individual pipes or joining sections of pipe of identical cross section area for flow.

7. The method according to claim 4, wherein the cross sectional area is identical along the full length of the embedded U-shaped pipe heat exchangers, implying an identical Reynold's number and thereby equal turbulence along the full embedded length of U-shaped pipe heat exchangers.

8. The method according to claim 4, wherein the U-shaped pipe heat exchangers are pipe heat exchangers, configured with diameter for turbulent flow at operating conditions.

9. The thermal energy storage element, built according to the method of claim 4.

* * * * *

UNITED STATES PATENT AND TRADEMARK OFFICE
CERTIFICATE OF CORRECTION

| | | |
|---|---|---|
| PATENT NO. | : 12,247,791 B2 | Page 1 of 1 |
| APPLICATION NO. | : 17/972115 | |
| DATED | : March 11, 2025 | |
| INVENTOR(S) | : Pål G. Bergan et al. | |

It is certified that error appears in the above-identified patent and that said Letters Patent is hereby corrected as shown below:

In the Claims

| | |
|---|---|
| Column 9, Claim 1, Lines 48-49 | Replace "the inner pipe and between the inner and outer pipes being identical;" with -- an inner pipe and between inner and outer pipes being identical; -- |
| Column 9, Claim 1, Line 52 | Replace "which the ends or connections of said heat exchanger" with -- which ends or connections of the pipe heat exchanger -- |
| Column 10, Claim 4, Line 33 | Replace "which the ends or connections" with -- which ends or connections -- |
| Column 10, Claim 7, Lines 58-59 | Replace "wherein the cross sectional area" with -- wherein a cross sectional area -- |
| Column 10, Claim 7, Lines 62-63 | Replace "length of U-shaped pipe heat exchangers." with -- length of the U-shaped pipe heat exchangers. -- |

Signed and Sealed this
Sixth Day of May, 2025

Coke Morgan Stewart
*Acting Director of the United States Patent and Trademark Office*